United States Patent [19]
Gavin

[11] Patent Number: 5,882,014
[45] Date of Patent: Mar. 16, 1999

[54] REMOVABLE SECTION PIPE SEAL FOR SEPTIC SYSTEMS

[76] Inventor: Norman W. Gavin, 2545 Ridge Rd., North Haven, Conn. 06473

[21] Appl. No.: 852,912

[22] Filed: May 8, 1997

Related U.S. Application Data

[60] Provisional application No. 60/026,070 Sep. 13, 1996.

[51] Int. Cl.[6] .................................................... F16J 15/10
[52] U.S. Cl. ............................................................ 277/602
[58] Field of Search ..................................... 277/604, 602, 277/606, 627, 626; 285/4, 148.23, 3, 159

[56] References Cited

U.S. PATENT DOCUMENTS

| | | | |
|---|---|---|---|
| 4,663,036 | 5/1987 | Strobl, Jr. et al. | 210/170 |
| 4,805,920 | 2/1989 | Gavin | 277/207 A |
| 5,036,636 | 8/1991 | Hasty | 52/100 |
| 5,057,501 | 10/1991 | Palmer | 277/9 |
| 5,104,542 | 4/1992 | Dixon et al. | 210/532.2 |
| 5,222,334 | 6/1993 | Hasty | 52/100 |
| 5,286,040 | 2/1994 | Gavin | 277/207 A |
| 5,507,501 | 4/1996 | Palmer | 277/602 |
| 5,538,035 | 7/1996 | Gavin | 137/363 |
| 5,711,536 | 1/1998 | Meyers | 277/606 |

*Primary Examiner*—Anthony Knight
*Assistant Examiner*—David Bochna
*Attorney, Agent, or Firm*—Robert A. Seemann

[57] ABSTRACT

A seal wall having a weakened annular ring for removing a section of the seal wall to form an annular seal lip for sealing around a pipe of predetermined diameter, has a weakened watertight portion of the wall configured for insertion of a tool through the wall, spaced from the weakened annular ring and connected to the weakened annular ring by a weakened line.

8 Claims, 4 Drawing Sheets

REMOVABLE SECTION PIPE SEAL FOR SEPTIC SYSTEMS

This application claims the benefit of U.S. Provisional Application No. 60/026,070, filed Sep. 13, 1996.

BACKGROUND OF THE INVENTION

1. Field of the Invention

The invention relates to seals having removable sections to fit various size pipes, more specifically to a tear-start portion of a seal wall that has a weakened annular portion, for initiating and continuing the tear without damaging edges of the seal wall which are to seal about the pipe. The tear-start portion is in the plane of the seal wall and is engaged by puncturing the seal wall away from the weakened annular portion.

2. Description of the Prior Art

A septic tank or a septic system distribution box may have a plurality of seals with removable sections mounted in the walls of the tank or box. Sections of selected seals are removed to accommodate pipes through the seals, while the remaining seals must remain water tight.

In FIG. 1, Prior Art seal unit 20 is cast into opening 22 in concrete wall 24 of a septic tank. This is a frustoconical 26 seal unit with an adjustable annular seal wall 30. The wall is adjusted to fit pipes of different predetermined diameter by tearing out a portion of the wall that is slightly smaller than the outer diameter of the pipe. This provides a tight fit of the remaining part of the seal wall around the pipe.

Sections of wall 30 can be severed from the wall by inserting a screw driver 32 or similar pointed instrument through the wall at annular groove 34 or annular groove 36. If the wall is torn out at annular groove 34, section 38 is removed, shown as 38'. This leaves an opening of diameter 42 through seal wall 30.

If the screw driver is inserted through the wall at annular groove 36, an opening for larger pipe is made through seal wall 30.

Tools on a job site are often rusty, or roughened, a screw driver blade is not curved to fit the annular groove, and the blade and can be accidentally inserted crosswise to the groove. This results in damage of the edge of the groove. The damage of the edge of the groove causes a leak space between the edge of the seal wall opening and the pipe.

U.S. Pat. Nos. 4,805,920 and 5,286,040 patented Feb. 21, 1989 and Feb. 15, 1994 respectively by N. Gavin describe a septic tank seal comprising a wall having removable sections which are torn out along weakened narrow annular portions like grooves 34 and 36 by insertion of a tool through the wall at the groove as discussed above.

U.S. Pat. No. 5,036,636 patented Aug. 6, 1991 by W. Hasty describes a flashing collar adapted to seal against more than one size of a vent pipe passing through the collar by removal of sections of the collar wall along annular separation rings of reduced thickness compared to the collar wall. The ring from which the section is removed seals around the vent pipe. Each ring has a weakened portion of the collar wall against one side of the ring along a length of the ring, and a pull tab extends substantially vertically from the weakened portion at the side of the ring along a length of the ring for gripping by a pliers for tearing from the seal wall, the section of seal wall that is immediately surrounded by the ring from the seal wall.

Pulling the tab alongside the ring, up from the wall in order to initiate the tear at the weakened portion can distort the edge of the ring if the tab is pulled uniformly across its width.

SUMMARY OF THE INVENTION

It is one object of the present invention to provide a separable wall seal for sealing around a pipe of predetermined diameter the separable wall comprising a weakened annular ring for removing a section of the wall to form an annular seal around the pipe of predetermined diameter by tearing the section from the wall along the weakened annular ring forming thereby a seal lip for the pipe, in which the seal lip is not damaged or distorted by the tearing of the section from the wall.

It is another object that the seal lip is not damaged by an element used to tear the section from the wall.

It is another object that the seal lip is not damaged by the tool that is used to initiate the tear of the section from the wall.

It is another object that the seal wall is configured for penetration by a tool spaced from the weakened annular ring for tearing the annular ring.

It is another object that the seal wall is penetrated at a discrete weakened site spaced from the weakened annular ring before the wall is broken at the weakened annular ring.

Other objects and advantages will become apparent from reading the ensuing description.

A septic tank system seal unit has a seal wall in which a section of the seal wall can be torn out along an annular ring of reduced thickness. The section of the wall comprises a tear-up portion that is a sealed part of the wall and is in the plane of the seal wall that immediately surrounds the tear-up portion. The tear-up portion can be torn up from the wall and continues to tear the wall along the annular ring of reduced thickness when the tear-up portion is pulled further until the section of the seal wall is removed from the seal wall.

The tear-up portion has a sealed, tool-access break-out or push-out ring that is spaced from the edges of the tear-up portion. The push-out ring gives way under pressure of a pointed tool as simple as a ball pen point. The pointed tool extending through the tear-up portion grips the tear-up portion for pulling the section of the seal wall from the seal.

BRIEF DESCRIPTION OF THE DRAWINGS

In order that the invention be more fully comprehended, it will now be described, by way of example, with reference to the accompanying drawings, in which.

DESCRIPTION OF THE PREFERRED EMBODIMENTS

Figure 1:
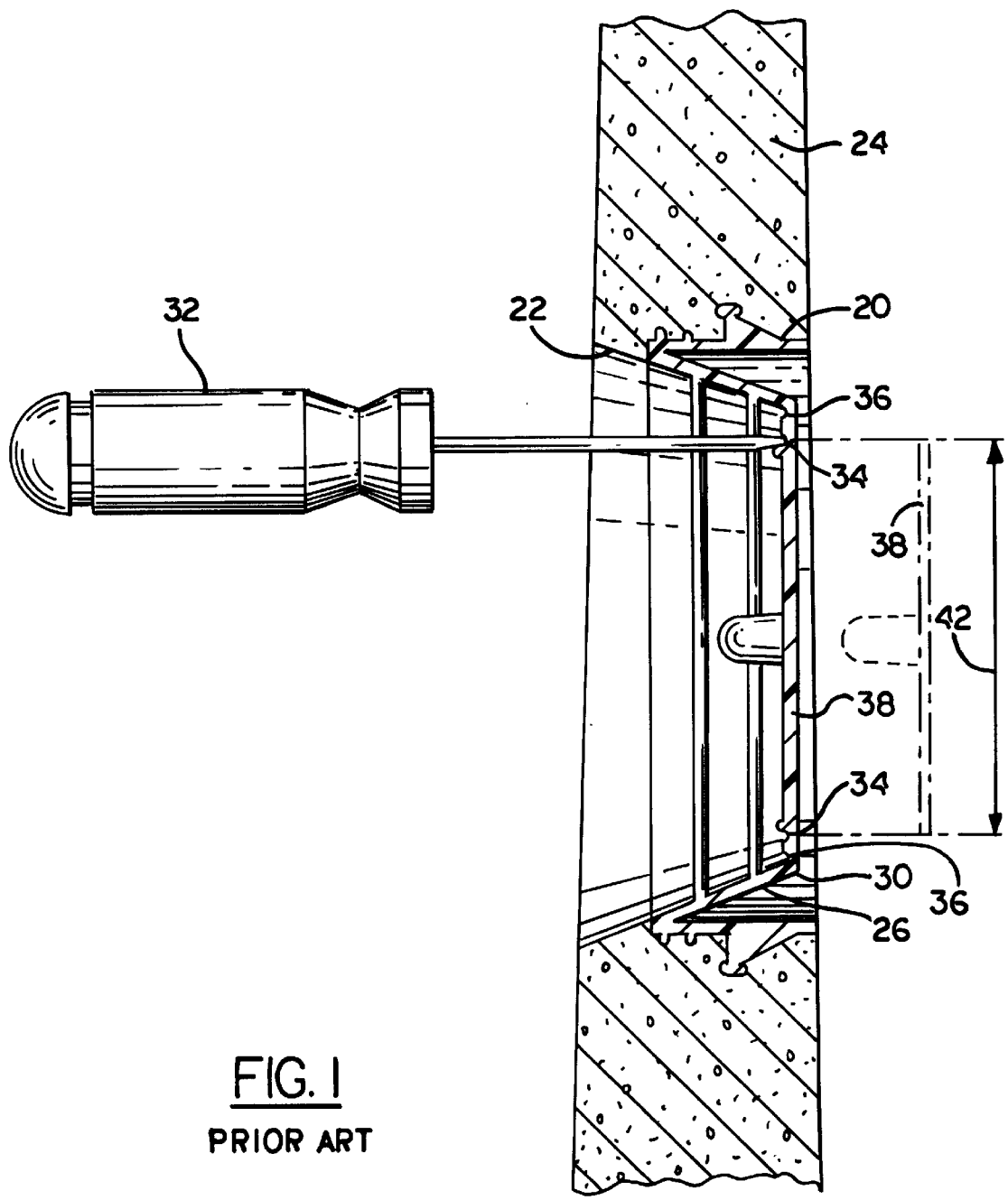
FIG. 1 is a schematic view of a prior art seal section removal arrangement.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

The present invention is not limited by most seal shapes, and can be used in seals having symmetrical or asymmetrical sections, and for seals having frustoconical, tubular, or flat seal walls. It can be used in septic tank seals of concrete and plastic tanks.

Figure 2:
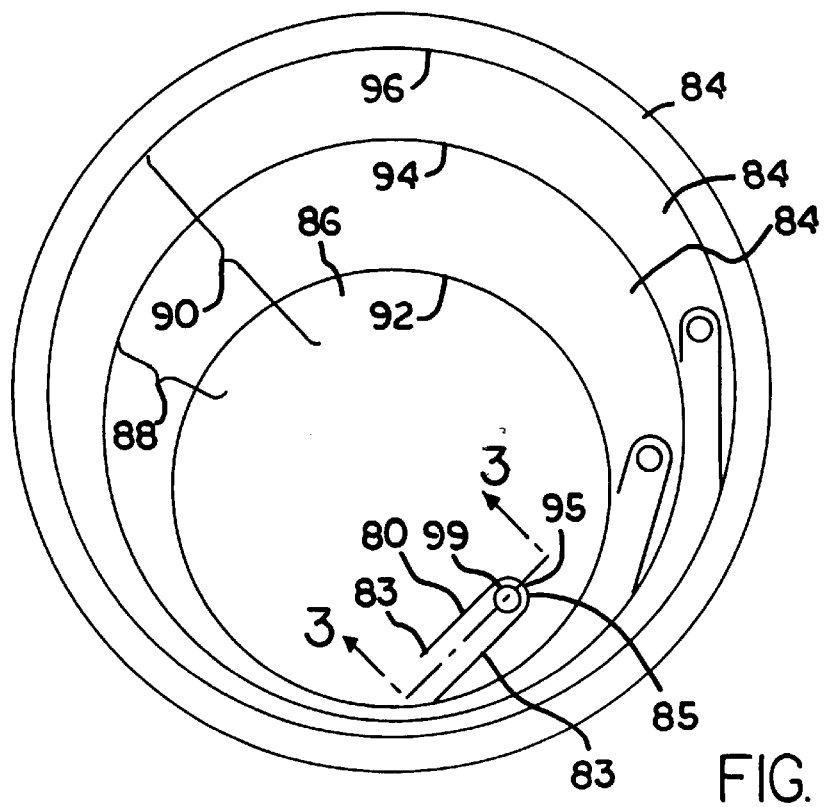
FIG. 2 is a schematic view of a seal of the present invention.
Figure 3:
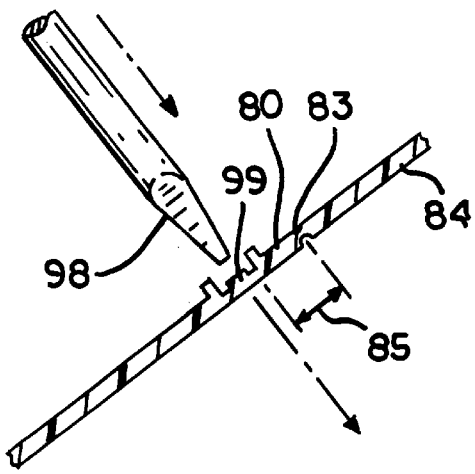
FIG. 3 a partial cross section view of the seal of FIG. 2 taken along 3—3.
Figure 4:
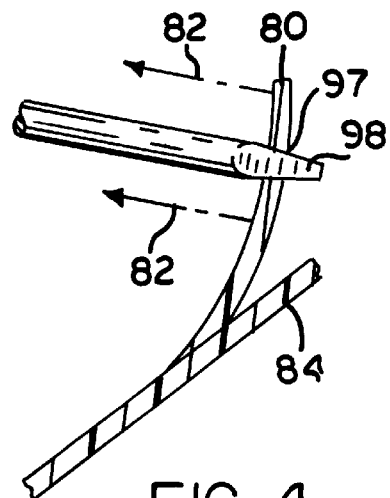
FIG. 4 As a side view of a portion of FIG. 2 showing a partially lifted portion of the seal wall.

In FIGS. 2–4, wall 84 has removable sections 86, 88, and 90 which are removed respectively by tearing out weakened annular rings formed by annular grooves 92, 94, and 96. Section 86 is removed by pulling portion 80 at end 95, upward 82 from wall 84. Portion 80 has a break-out, sealed, tool access ring 99 that is a water-tight part of wall 84, and which remains water-tight unless it is pushed out by a pen point 98, or other tool. As shown in FIGS. 2 and 3, ring 99 is spaced 85 from weakened line 83. The tool then uses hole 97 resulting from pushing out of ring 99, to hold portion 80 to pull portion 80 up in order to tear annular groove 92 to remove section 86. This leaves a sealing lip for pipe, formed by the annular edge of the wall at the remainder of groove 92.

The seal wall plane is penetrated by the tool spaced from the edge of the seal section to remove the seal section from the seal wall.

Referring to FIGS. 5–8, seal wall 130 front side 132 includes weakened annular rings in the wall made by grooves 136, 138, and 140, and has raised ridges 146 and 148. Back side 134 of wall 130 has raised ridges 156 and 158 on the same radiuses as ridges 146 and 148 respectively.

The raised ridges guide the tear at the weakened annular rings, prevent radial tears or cracks at the edge of the hole through the seal wall that is formed when a section of the wall is torn out at the weakened annular rings, and provide a pipe sealing washer at the edge or sealing lip of the hole. The pipe sealing washer comprising the opposed rings extends from and strengthens the front and back sides of the wall at the edge or sealing lip of the hole and provides chamfers in both directions, front and back, for easing pipe through the hole.

Figure 5:
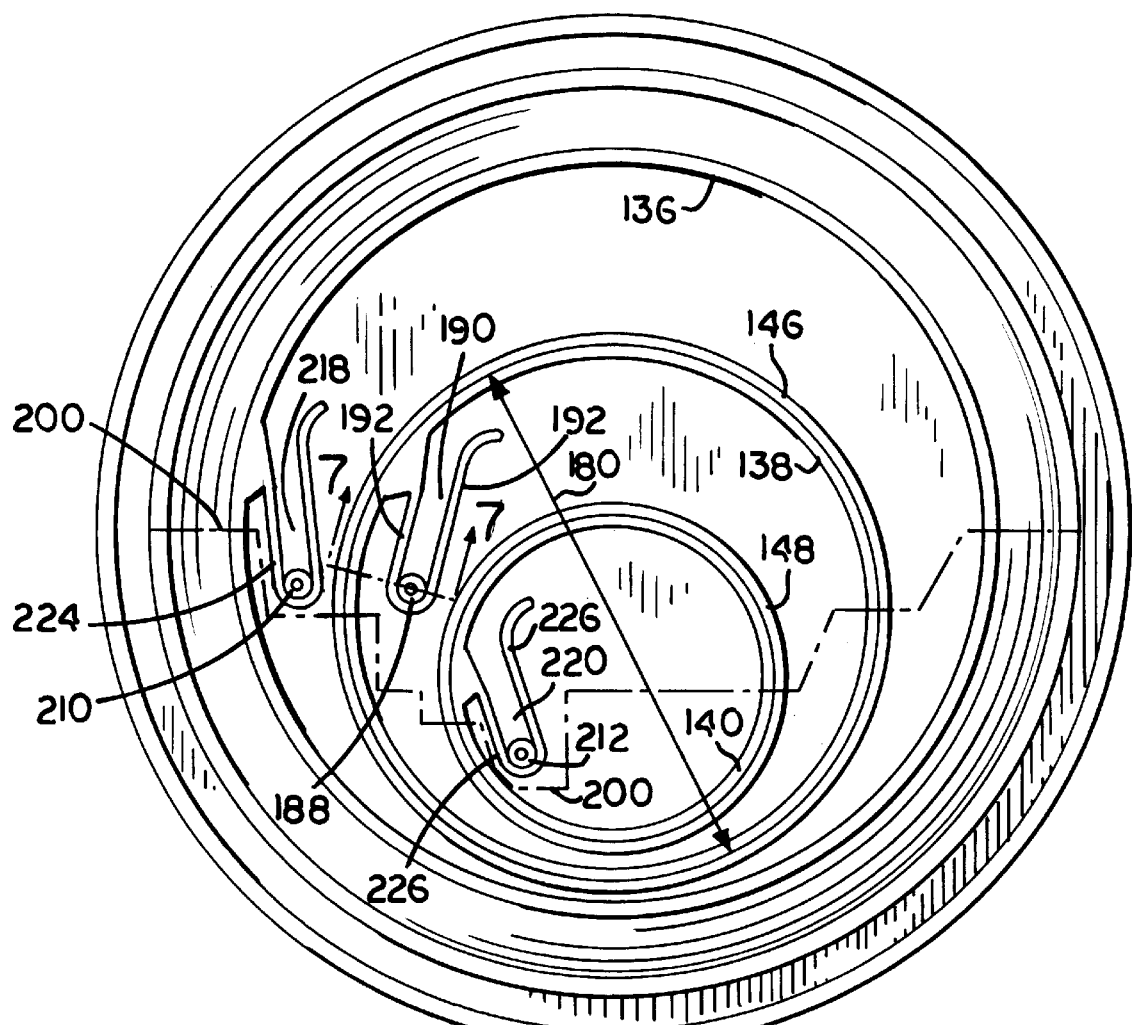
FIG. 5 is a schematic front view of a seal of the present invention.

Section 180 is removed from seal wall 130 by inserting pen 184 through break out ring 188 which breaks the watertight seal of wall 130 and using the pen to twist and tear out portion 190 along weakened line 192 in the wall which defines and weakens portion 190 and continuing the tear along weakened annular ring 138 until section 180 is removed from seal wall 130. As shown in FIG. 5, break out ring 188 is surrounded on only three sides by weakened line 192. Ring 188 therefore reinforces portion 190 around weakened site 189 where the pen is inserted through ring 188, and ring 188 spaces 185 weakened site 189 from weakened line 192.

If a tool is used that is not as sharp as pen 184, ring 188 is pushed out of the wall, breaking out around 192, and section 190 can be gripped and pulled to continue the tear across the wall to and along annular ring 138.

Figure 6:
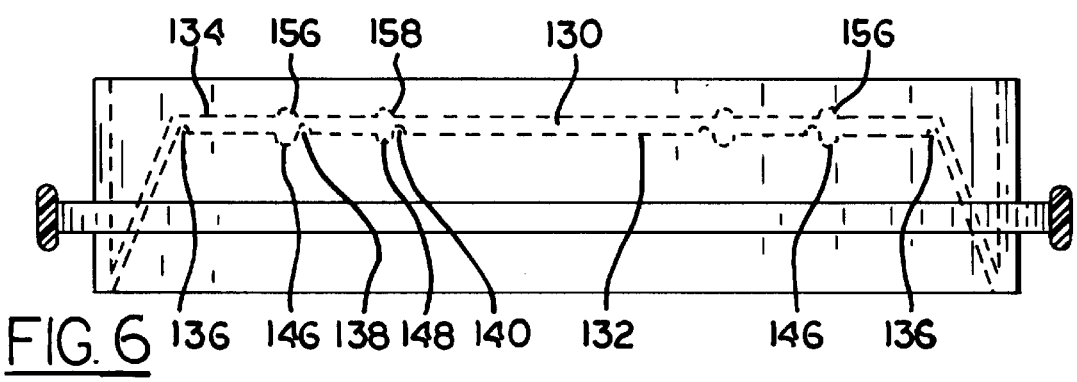
FIG. 6 is a schematic top view of the seal of FIG. 5.
Figure 7:
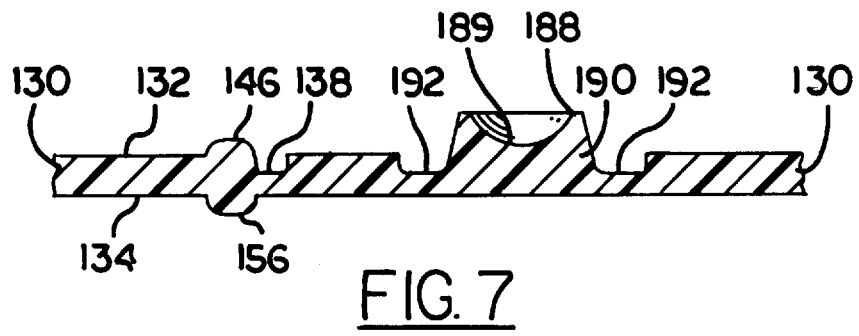
FIG. 7 is a partial cross section view of the seal of FIG. 5 taken along 7—7.
Figure 8:
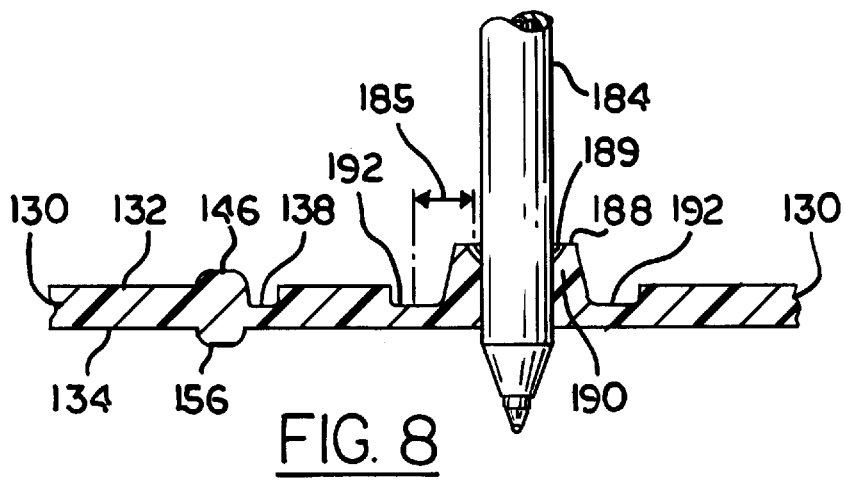
FIG. 8 is a partial cross section of the seal of FIG. 5 taken along 7—7, with a pen inserted through a break out ring.

The weakened annular ring grooves and raised ridges are shown in FIG. 6 with reference to locator line 200 in FIG. 5, and break out rings 210, 212, tear out portions 218, 220, and weakened lines 224, 226 are not shown, for clarity of description.

While the preferred embodiment of the invention has been shown and described, it will be understood that the invention may be embodied otherwise than as herein specifically illustrated or described, and that certain changes in form and arrangement of parts and in the specific manner of practicing the invention may be made without departing from the underlying idea or principles of this invention within the scope of the appended claims.

What I claim is:

1. In a separable wall seal for sealing around a pipe of predetermined diameter the separable wall comprising a weakened annular ring (138) for removing a section of the wall to form an annular seal to fit around the pipe of predetermined diameter by tearing the section from the wall along the weakened annular ring forming thereby a sealing lip for the pipe, the improvement comprising a weakened line (192) diverging from said weakened annular ring, extending to a weakened watertight portion (190) of said wall configured for receiving a tool through said wall, in said portion, said portion comprising means for spacing the tool from the wall adjacent to said portion when the tool is through said wall in said portion, for tearing said section from the wall along said weakened annular ring.

2. In a separable wall seal for sealing around a pipe of predetermined diameter the separable wall comprising a weakened annular ring for removing a section of the wall to form an annular seal to fit around the pipe of predetermined diameter by tearing the section from the wall along the weakened annular ring forming thereby a sealing lip for the pipe, the improvement comprising a weakened line diverging from said weakened annular ring, extending to a weakened watertight portion of said wall configured for receiving a tool through said wall, in said portion, said portion comprising means for spacing the tool from said line when the tool is through said wall in said portion, for tearing said section from the wall along said weakened annular ring.

3. The improved separable wall seal of claim 2 wherein said means for spacing the tool from the wall comprises a ridge on said weakened watertight portion configured for extending around said tool when said tool is through said wall by being received through said portion.

4. The improved separable wall seal of claim 3 wherein said weakened line extends in an arc of reduced wall thickness around said ridge.

5. In a separable wall seal for sealing around a pipe of predetermined diameter the separable wall comprising a weakened annular ring for removing a section of the wall to form an annular seal to fit around the pipe of predetermined diameter by tearing the section from the wall along the weakened annular ring forming thereby a sealing lip for the pipe, the improvement comprising a portion of the wall formed in a tear-up strip defined by a weakened margin around said strip extending to said weakened annular ring at one end of said strip, the other end of said strip having means for tearing said strip from said wall consisting of a weakened site for insertion of a tool through the wall, said weakened site being a watertight portion of the wall.

6. The improved separable wall seal of claim 5, wherein said weakened site is spaced from said weakened margin.

7. In a separable wall seal for sealing around a pipe of predetermined diameter the separable wall comprising a weakened annular ring for removing a section of the wall to form an annular seal to fit around the pipe of predetermined diameter by tearing the section from the wall along the weakened annular ring forming thereby a sealing lip for the pipe, the improvement comprising a portion of the wall formed in a tear-up strip defined by a weakened margin around said strip extending to said weakened annular ring at one end of said strip, a weakened site in the other end of said strip for insertion of a tool through the wall for tearing said strip from said wall, said weakened site being a watertight portion of the wall.

8. The improved separable wall seal of claim 7, wherein said weakened site is spaced from said weakened margin.

* * * * *